(12) United States Patent
Kimura et al.

(10) Patent No.: US 9,445,268 B2
(45) Date of Patent: Sep. 13, 2016

(54) RECORDING MEDIUM, MOBILE ELECTRONIC DEVICE, AND OPERATION CONTROL METHOD

(71) Applicant: FUJITSU LIMITED, Kawasaki-shi, Kanagawa (JP)

(72) Inventors: Shinya Kimura, Sapporo (JP); Katsuaki Akama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/938,895

(22) Filed: Jul. 10, 2013

(65) Prior Publication Data

US 2014/0073293 A1 Mar. 13, 2014

(30) Foreign Application Priority Data

Sep. 7, 2012 (JP) .................................. 2012-197866

(51) Int. Cl.
| | |
|---|---|
| H04M 1/66 | (2006.01) |
| H04B 1/38 | (2015.01) |
| H04W 12/06 | (2009.01) |
| G06F 21/62 | (2013.01) |
| G06F 21/84 | (2013.01) |
| H04M 1/725 | (2006.01) |
| H04M 1/67 | (2006.01) |

(52) U.S. Cl.
CPC .............. *H04W 12/06* (2013.01); *G06F 21/62* (2013.01); *G06F 21/84* (2013.01); *H04M 1/72522* (2013.01); *H04M 1/67* (2013.01)

(58) Field of Classification Search
USPC ................................. 455/411, 566
See application file for complete search history.

(56) References Cited

U.S. PATENT DOCUMENTS

| | | | |
|---|---|---|---|
| 6,266,775 | B1 | 7/2001 | Kamba |
| 7,689,939 | B1 | 3/2010 | Becker |
| 2010/0289764 | A1 | 11/2010 | Akabe et al. |
| 2012/0084734 | A1 | 4/2012 | Wilairat |
| 2012/0284789 | A1* | 11/2012 | Kim et al. ............ 726/19 |

FOREIGN PATENT DOCUMENTS

| | | |
|---|---|---|
| EP | 0952511 A2 | 10/1999 |
| EP | 2264641 A1 | 12/2010 |
| JP | 2000-339053 | 12/2000 |
| JP | 2010-266997 | 11/2010 |

OTHER PUBLICATIONS

Extended European Search Report dated Jan. 23, 2014 for corresponding European Application No. 13177421.8.
CNOA—Office Action of Chinese Patent Application No. 201310324932.7 mailed Jan. 26, 2016, with English translation.
EPOA—Office Action of European Patent Application No. 13177421.8 mailed on Mar. 2, 2016.

* cited by examiner

*Primary Examiner* — Joel Ajayi
(74) *Attorney, Agent, or Firm* — Fujitsu Patent Center

(57) ABSTRACT

A processor of a mobile terminal refers to an app table that stores a reference flag on a per-app basis, the flag indicating whether the operation-unlock app screen is to be displayed in the foreground window of a display. Furthermore, the processor acquires from the app table the flag that corresponds to the current app in response to a lighting-off command. Moreover, the processor determines whether the operation-unlock app screen is to be displayed in the foreground window instead of the current app screen on the basis of the acquired flag. On the basis of the result of the determination, the processor controls the changing of a screen in the foreground window.

7 Claims, 13 Drawing Sheets

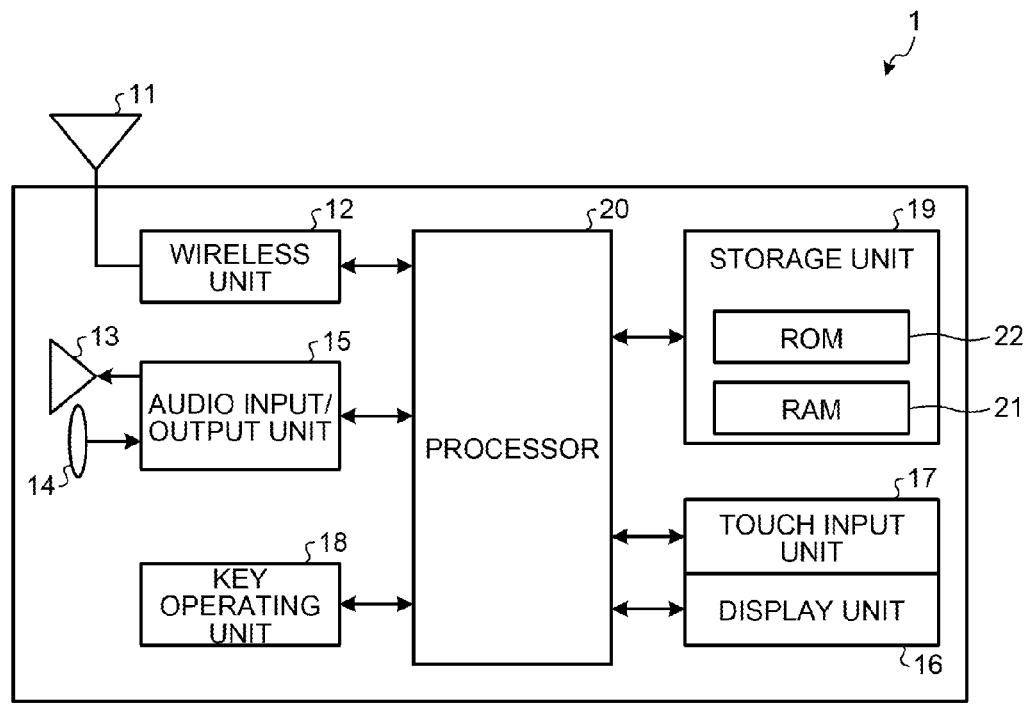

FIG.3

| SCREEN POSITION | APP ID (APID) |
|---|---|
| FOREGROUND | MAP (APID-2) |
| BACKGROUND | SCREEN UNLOCK (APID-1) |

FIG.4

| OPERATION TYPE | OPERATION FLAG |
|---|---|
| TOUCH PANEL OPERATION | OPERABLE |
| KEY OPERATION | INOPERABLE |
| SCREEN TRANSITION | INOPERABLE |
| FILE REFERENCING | INOPERABLE |
| EXTERNAL CONNECTION | INOPERABLE |
| COMMUNICATION | INOPERABLE |

FIG.13

| OPERATION TYPE / APP | TOUCH PANEL OPERATION | KEY OPERATION | SCREEN TRANSITION | FILE REFERENCING | EXTERNAL CONNECTION | COMMUNICATION |
|---|---|---|---|---|---|---|
| MAP | OPERABLE | INOPERABLE | INOPERABLE | INOPERABLE | INOPERABLE | INOPERABLE |
| BROWSER | OPERABLE | INOPERABLE | INOPERABLE | INOPERABLE | INOPERABLE | INOPERABLE |
| MUSIC | OPERABLE | OPERABLE | OPERABLE | OPERABLE | INOPERABLE | INOPERABLE |
| RECIPE | OPERABLE | INOPERABLE | INOPERABLE | INOPERABLE | INOPERABLE | INOPERABLE |
| PICTURE DRAWING | OPERABLE | INOPERABLE | INOPERABLE | OPERABLE | INOPERABLE | INOPERABLE |
| GAME | OPERABLE | OPERABLE | OPERABLE | INOPERABLE | INOPERABLE | INOPERABLE |

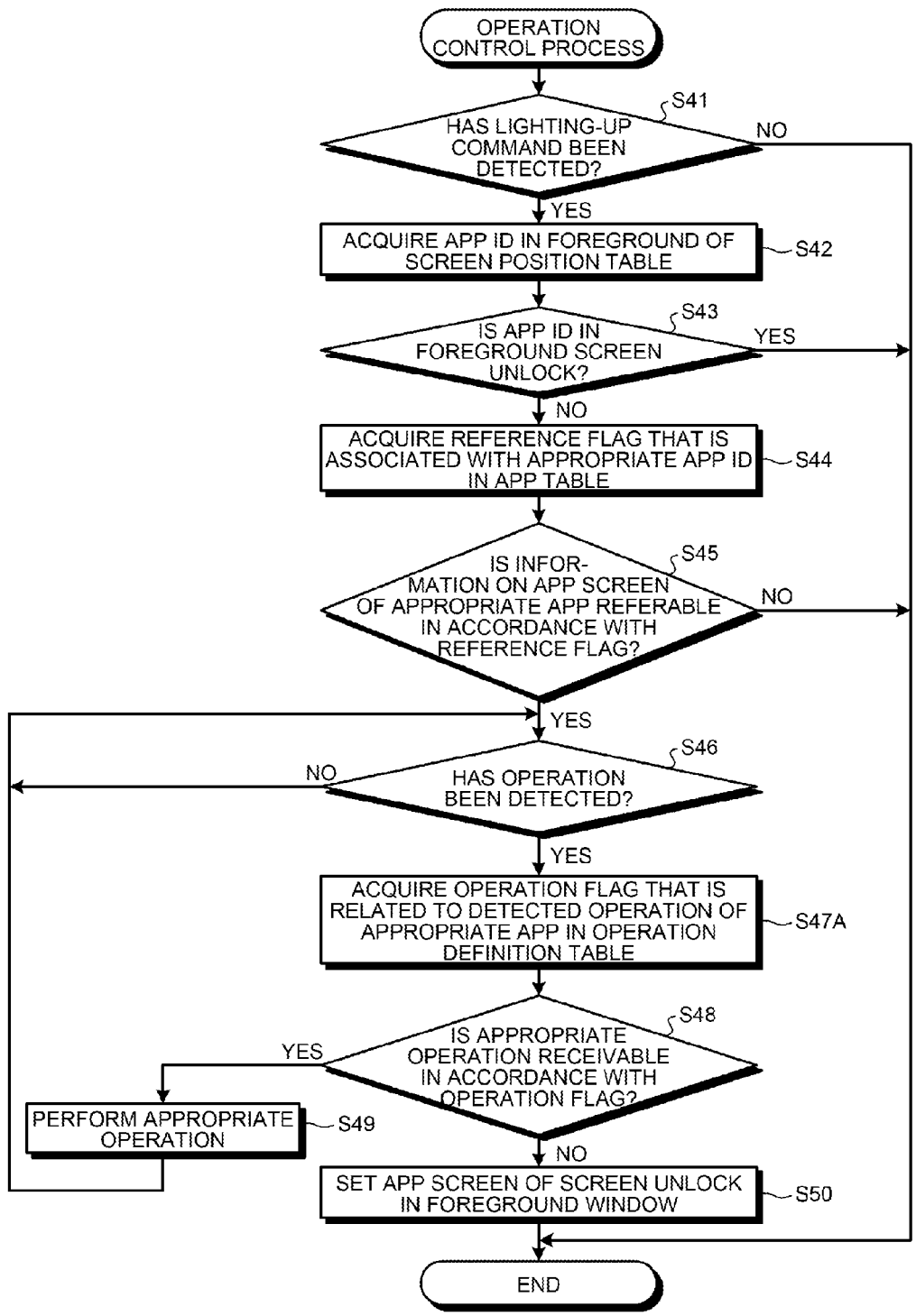

RECORDING MEDIUM, MOBILE ELECTRONIC DEVICE, AND OPERATION CONTROL METHOD

CROSS-REFERENCE TO RELATED APPLICATION

This application is based upon and claims the benefit of priority of the prior Japanese Patent Application No. 2012-197866, filed on Sep. 7, 2012, the entire contents of which are incorporated herein by reference.

FIELD

The embodiments discussed herein are related to a mobile electronic device, a recording medium and an operation control method.

BACKGROUND

In recent years, authentication systems for mobile electronic devices using handwriting traces have been disclosed. For example, the screen of a display unit of a mobile electronic device is lighted down when a screen lighting-down operation of the display unit is detected or when the duration of non-operating time continues for a time period equal to or greater than a predetermined time period.

For example, if the duration of non-operating time has continued for a time period equal to or greater than a predetermined time period while an application screen is screen-displayed on the display unit of a mobile electronic device, the screen of the display unit is lighted down. Afterward, when the screen of the display unit of the mobile electronic device is lighted up again and, when a user's recovery operation for displaying the application screen again is detected, an authentication screen is displayed on the screen in an operation-locked state where information referencing and operation reception via the application screen are not allowed. Accordingly, as the mobile electronic device shifts to the operation-locked state, user's incorrect operations on the mobile electronic device or unauthorized operations by a third party can be prevented.

Furthermore, in the mobile electronic device, if a user is authenticated in response to an authentication operation on the authentication screen, the operation-locked state is canceled and the application screen is displayed again. As a result, information referencing and operation reception on the application screen of the mobile electronic device are allowed for the user. Japanese Laid-open Patent Publication No. 2010-266997

In mobile electronic devices, however, if the duration of non-operating time has continued for a time period equal to or greater than a predetermined time period, for example, when the application screen of a map application is displayed, the display unit is lighted down and then the authentication screen is displayed in response to a user's recovery operation. After the screen of the display unit is lighted down, the application screen is displayed again so that the application screen can be continuously used; however, every time this happens, the user of the mobile electronic device needs to perform an authentication operation on the authentication screen, i.e., perform an operation for canceling the operation-locked state.

SUMMARY

According to an aspect of an embodiment, a mobile electronic device includes a processor. The processor executes a process. The process includes referring to a storage that stores identification information on a per-application basis, the identification information indicating whether an authentication screen is to be screen-displayed in a foreground window of a display, and acquiring from the storage identification information that corresponds to a current application in response to a predetermined command. The process includes determining whether the authentication screen is to be screen-displayed in the foreground window on the basis of the acquired identification information. The process includes controlling changing of a screen in the foreground window on the basis of a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an explanatory diagram that illustrates an example of a mobile terminal according to a first embodiment;

FIG. 2 is an explanatory diagram that illustrates an example of an app table;

FIG. 3 is an explanatory diagram that illustrates an example of a screen position table;

FIG. 4 is an explanatory diagram that illustrates an example of an operation definition table;

FIG. 13 is an explanatory diagram that illustrates an example of an operation definition table in the mobile terminal according to a second embodiment;

FIG. 14 is a flowchart that illustrates an exemplary operation of the processor in relation to an operation control process according to the second embodiment.

DESCRIPTION OF EMBODIMENTS

Figure 5:
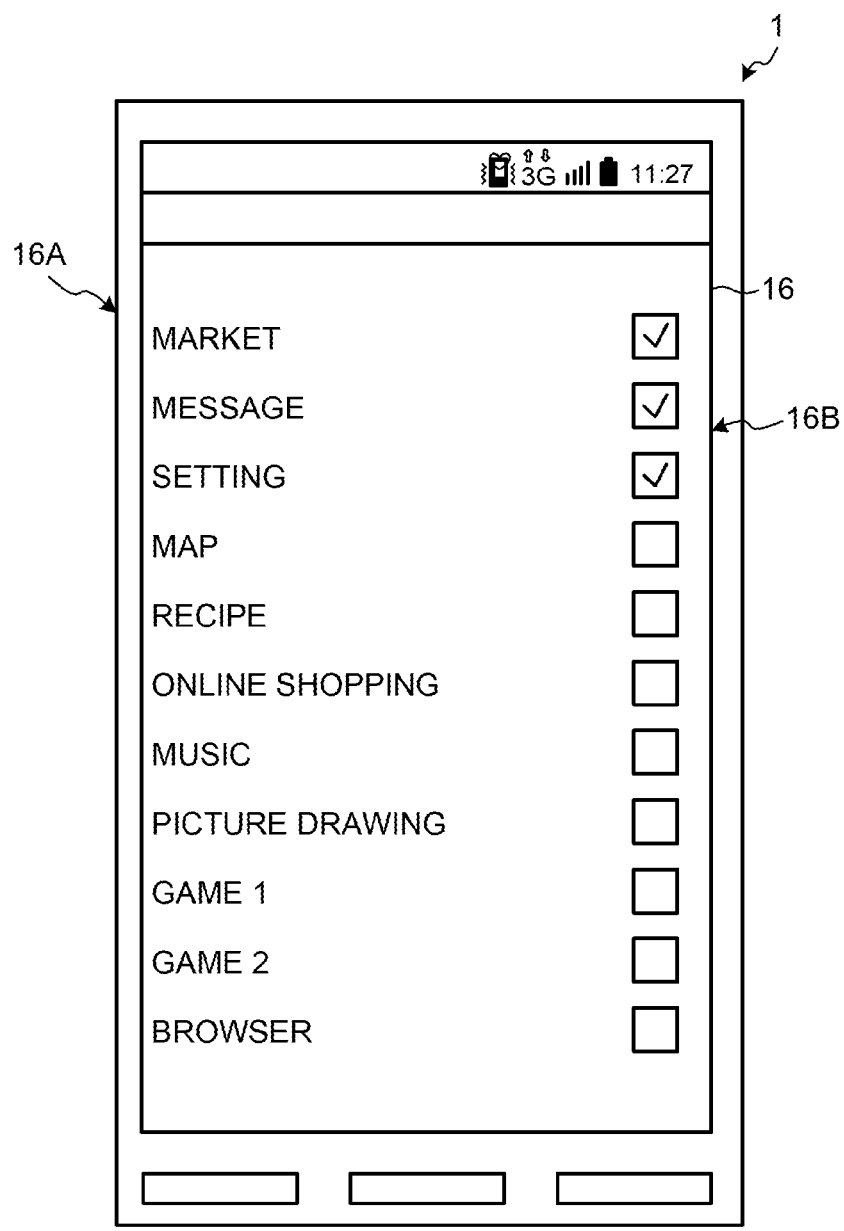
FIG. 5 is an explanatory diagram that illustrates an example of an app list display.

Preferred embodiments of the present invention will be explained with reference to accompanying drawings.

The disclosed technology is not limited to the embodiments. The following embodiments may be combined as appropriate to the extent that there is no contradiction.

[a] First Embodiment

FIG. 1 is an explanatory diagram that illustrates an example of a mobile terminal 1 according to a first embodiment. The mobile terminal 1 illustrated in FIG. 1 is, for example, a mobile phone, such as a smartphone. The mobile terminal 1 includes an antenna 11, a wireless unit 12, a speaker 13, a microphone 14, an audio input/output unit 15, a display unit 16, a touch input unit 17, and a key operating unit 18. The mobile terminal 1 further includes a storage unit 19 and a processor 20. The storage unit 19 includes a RAM (Random Access Memory) 21 and a ROM (Read Only Memory) 22.

The wireless unit 12 transmits and receives wireless signals via the antenna 11. The audio input/output unit 15 performs audio processing on sound collected by the microphone 14 and also performs audio processing on audio signals included in the wireless signals received via the wireless unit 12 and then outputs the sound from the speaker 13. The display unit 16 is an output interface that screen-displays various types of information, such as an application (hereafter, simply referred to as app) screen, or the like. The touch input unit 17 is an input interface that detects a touch operation on the screen of the display unit 16. The key operating unit 18 is an input interface that detects a key operation of the mobile terminal 1.

The RAM 21 is a memory area that stores therein various types of information. The RAM 21 stores therein an app table 31, a screen position table 32, and an operation definition table 33. The ROM 22 stores therein various types of programs, such as an operation control program. The processor 20 performs overall control of the mobile terminal 1. The processor 20 reads an operation control program stored in the ROM 22 and executes processes of various functions in accordance with the read operation control program.

FIG. 2 is an explanatory diagram that illustrates an example of the app table 31. The app table 31 illustrated in FIG. 2 manages an app ID 31A and a reference flag 31B that are related to each other. The app ID 31A is identification information that identifies an app. The reference flag 31B is identification information that indicates whether information on the app screen is referable with respect to the app even when in an operation-locked state. The operation-locked state is, for example, a state in which an operation-unlock app screen (authentication screen) is screen-displayed in the foreground window of the display unit 16 so that any operation except for an unlock operation (authentication operation) is not receivable on the operation-unlock app screen or information is not allowed to be referred to. The processor 20 shifts to an operation-locked state when a lighting-down operation is detected or when the duration of non-operating time continues for a time period equal to or greater than a predetermined time period.

The processor 20 refers to the app table 31 and, if the reference flag 31B in the app table 31 is "referable", it is determined with respect to the app that information on the app screen can be referred to even in the operation-locked state. Furthermore, the processor 20 refers to the app table 31 and, if the reference flag 31B in the app table 31 is "not referable", it is determined with respect to the app that the app and the information on the app screen are not referable in the operation-locked state. If the app ID 31A is for example a map app, the processor 20 determines that the reference flag 31B for the map app is "referable". Moreover, if the app ID 31A is an online shopping app, the processor 20 determines that the reference flag 31B for the online shopping is "not referable".

FIG. 3 is an explanatory diagram that illustrates an example of the screen position table 32. The screen position table 32 illustrated in FIG. 3 manages a screen position 32A of the display unit 16 and an app ID 32B that are related to each other. The screen position 32A is the screen position of a foreground window or background window of the display unit 16. The foreground window corresponds to a screen window in the foreground of the display unit 16. The background window is a screen window behind the foreground among the display screens of the display unit 16.

The processor 20 refers to the screen position table 32 illustrated in FIG. 3, thereby recognizing a status in which the app screen of the map app is screen-displayed in the foreground window of the display unit 16 and in which the screen-unlock app screen is screen-displayed in the background window of the display unit 16. If, for example, the screen-unlock app screen is screen-displayed in the foreground window, the processor 20 shifts to an operation-locked state where an operation is not receivable except for an unlock operation for unlocking the screen and where information on the app screen of the map app is not referable.

FIG. 4 is an explanatory diagram that illustrates an example of the operation definition table 33. The operation definition table 33 illustrated in FIG. 4 manages an operation type 33A and an operation flag 33B that are related to each other. The operation definition table 33 contains definitions on the operation types indicating whether an operation is receivable or not in an operation-locked state. The operation type 33A identifies an operation type. The operation type 33A includes, for example, a touch panel operation, key operation, screen transition, file referencing, external connection, communication, and the like. The touch panel operation corresponds to an input operation of the touch input unit 17 and is for example a scrolling operation, zoom-in or zoom-out operation, or the like, on the app screen of the map app. The key operation is an input operation of the key operating unit 18. The screen transition is a screen switching operation. The file referencing is an operation to refer to a different file. The external connection is an operation to connect to a different external device. The communication is for example a communication operation using the wireless unit 12. The operation flag 33B is identification information for each operation type 33A that identifies "operable", where an operation is receivable in the operation-locked state, or "not operable", where an operation is not receivable in the operation-locked state.

The processor 20 refers to the operation definition table 33 illustrated in FIG. 4 and, if the operation type 33A is for example "touch panel operation", the processor 20 determines that the operation flag 33B is "operable" and determines that the operation is receivable. Furthermore, the processor 20 refers to the operation definition table 33 and, if the operation type 33A is, for example, "key operation", the processor 20 determines that the operation flag 33B is "not operable" and determines that the operation is not receivable.

FIG. 5 is an explanatory diagram that illustrates an example of an app list display. The processor 20 screen-displays a list of apps that are currently available in the mobile terminal 1 as an app list display on the display unit 16. The app list includes a check box 16B for each app name 16A by which a setting is made to determine whether information on the app screen is allowed to be referred to in an operation-locked state. A user views the app list screen-displayed on the display unit 16 and, by checking or not checking the check box 16B, registers the settings in the app table 31 on the apps as to whether information is referable when in an operation-locked state.

Figure 6:
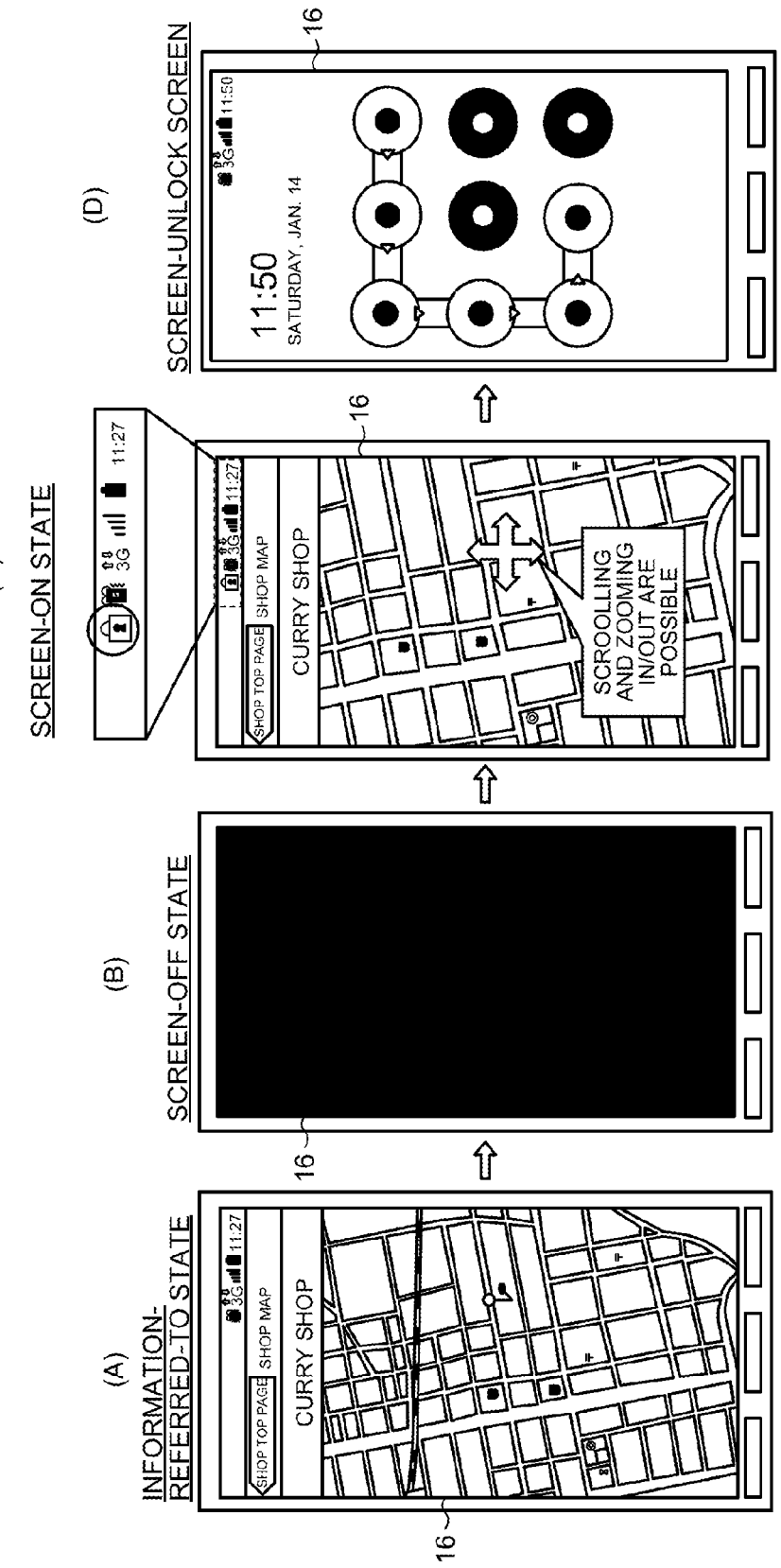
FIG. 6 is an explanatory diagram that illustrates an example of the operation transition of an operation screen screen-displayed on a display unit.

FIG. 6 is an explanatory diagram that illustrates an example of the operation transition of the operation screen screen-displayed on the display unit 16. FIG. 6(A) illustrates, for example, an app screen of a map app. A user can view the app screen and refer to the information on the app screen. FIG. 6(B) illustrates a screen in a screen-off state (lighting-down state) obtained by lighting down the display unit 16 in response to a lighting-down command. FIG. 6(C) illustrates an operation-restricted app screen of the map app in response to a recovery operation. The recovery operation is a re-lighting operation to shift from a screen-off state to a screen-on state. The operation-restricted app screen is an app screen of an app for which operations are restricted in an operation-locked state. The processor 20 screen-displays an operation-restricted app screen in the foreground window of the display unit 16 and screen-displays a screen-unlock app screen in the background window. Status information indicating an operation-restricted app screen is located in the upper section of the app screen illustrated in FIG. 6(C). A user views the status information so as to recognize that the screen is an operation-restricted app screen. FIG. 6(D) illustrates a screen-unlock app screen. The processor 20 screen-displays a screen-unlock app screen in the foreground window of the display unit 16. The processor 20 is in a state where an unlock operation for unlocking the screen can be received.

As illustrated in FIG. 6(A), the processor 20 screen-displays the app screen of the map app in the foreground window of the display unit 16. As illustrated in FIG. 6(B), the processor 20 lights down (i.e. turns off) the display unit 16 in response to a lighting-down command so as to obtain the off screen. The lighting-down command is a command started, for example, when the duration of non-operating time continues for a time period equal to or greater than a predetermined time period or when a screen lighting-down operation is detected. As illustrated in FIG. 6(C), the processor 20 screen-displays the app screen of the map app in the foreground window and also screen-displays the screen-unlock app screen in the background window. At that time, status information is screen-displayed in the upper section of the foreground window. As a result, a user views the status information so as to recognize that the screen is an operation-restricted app screen.

When detecting an operation which is receivable on the operation-restricted app screen, the processor 20 executes a command on the basis of the operation type. Furthermore, when detecting an operation that is not receivable on the operation-restricted app screen, the processor 20 screen-displays the screen-unlock app screen in the foreground window, as illustrated in FIG. 6(D), and also screen-displays the app screen of the map display in the background window. As the processor 20 screen-displays the screen-unlock app screen in the foreground window, a state is obtained such that an operation except for an unlock operation is not receivable or information on the app screen of the map app is not referable.

Figure 7:
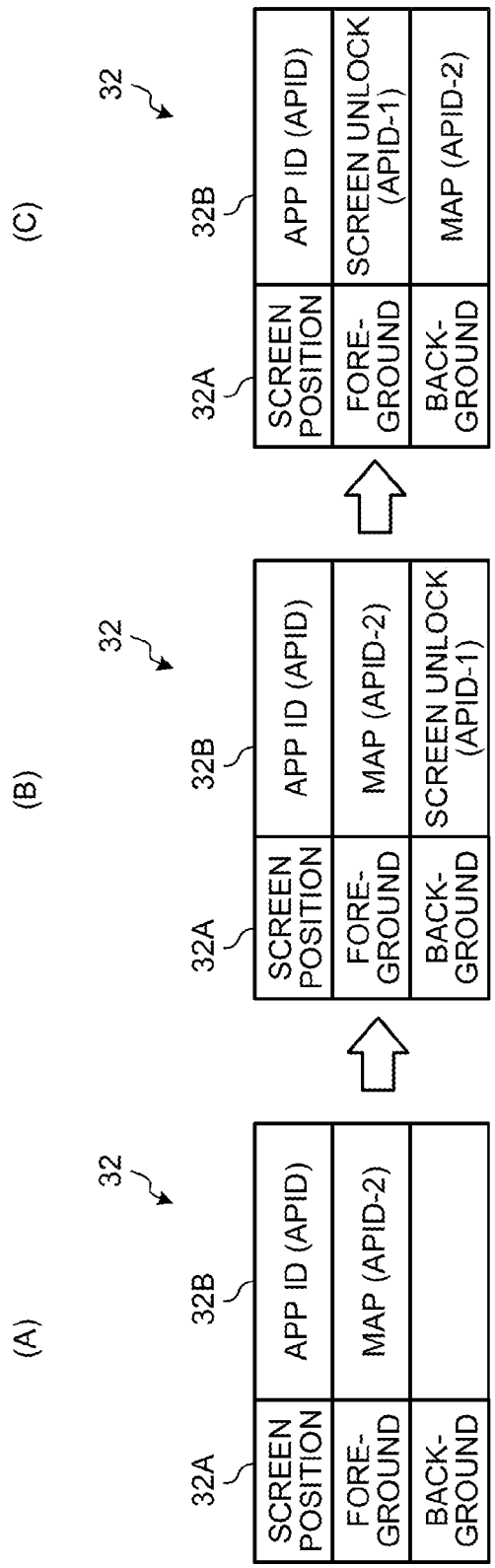
FIG. 7 is an explanatory diagram that illustrates an example of the operation transition of the screen position table.

FIG. 7 is an explanatory diagram that illustrates an example of the operation transition of the screen position table 32. In the case of the state illustrated in FIG. 6(A), the screen position table 32 illustrated in FIG. 7(A) registers the app ID 32B of the map app in the "foreground" of the screen position 32A. If there is no app in the background window, the app ID 32B is not registered in the "background" of the screen position 32A. Moreover, in the case of the state illustrated in FIG. 6(C), the screen position table 32 illustrated in FIG. 7(B) registers the app ID 32B of the map app in the "foreground" and registers the app ID 32B of the screen unlock in the "background". Furthermore, in the case of the state illustrated in FIG. 6(D), the screen position table 32 illustrated in FIG. 7(C) registers the app ID 32B of the screen unlock in the "foreground" and registers the app ID 32B of the map app in the "background".

Figure 8:
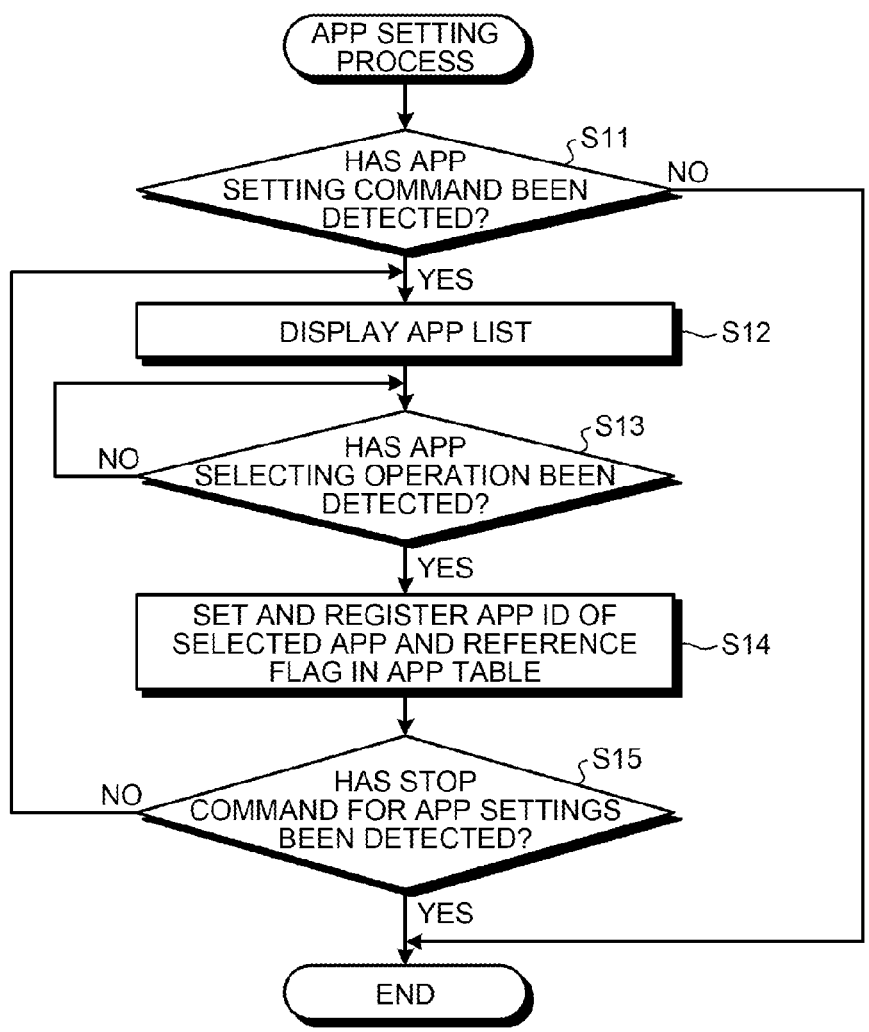
FIG. 8 is a flowchart that illustrates an exemplary operation of a processor in relation to an app setting process.

Next, an explanation is given of an operation of the mobile terminal 1 according to the first embodiment. FIG. 8 is a flowchart that illustrates an exemplary operation of the processor 20 in relation to an app setting process. The app setting process illustrated in FIG. 8 is a process of setting and registering the reference flag 31B for each app ID 31A in the app table 31 in response to a user's setting operation.

With reference to FIG. 8, the processor 20 determines whether an app setting command has been detected (Step S11). The app setting command is started in response to a user's predetermined operation. If an app setting command has been detected (Yes at Step S11), the processor 20 screen-displays the app list illustrated in FIG. 5 on the display unit 16 (Step S12). A user views the app list so as to be aware of all of the apps on the mobile terminal 1. The processor 20 determines whether an operation for selecting an information-referred-to app from the screen-displayed app list has been detected (Step S13). The app selecting operation corresponds to, for example, an operation of checking the check box 16B that is associated with the app name 16A of the information-referred-to app for which information on the app screen is referable even in an operation-locked state, the app name 16A being included in the app names 16A of the app list.

If an operation for selecting an information-referred-to app has been detected (Yes at Step S13), the processor 20 sets and registers the app ID 31A of the selected app and the reference flag 31B in the app table (Step S14). As a result, a user can easily register an information-referred-to app.

After setting and registering the app ID 31A and the reference flag 31B in the app table 31, the processor 20 determines whether a stop command for the app settings has been detected (Step S15). A stop command for the app settings is started in response to a user's stop operation. If a stop command for the app settings has been detected (Yes at Step S15), the processor 20 stops the operation illustrated in FIG. 8.

If an app setting command has not been detected (No at Step S11), the processor 20 stops the operation illustrated in FIG. 8. Further, if an operation of selecting an app has not been detected (No at Step S13), the processor 20 proceeds to Step S13 so as to determine whether an operation of selecting an app has been detected. Furthermore, if a stop command for the app settings has not been detected (No at Step S15), the processor 20 proceeds to Step S12 so as to screen-display a list of apps.

In the app setting process illustrated in FIG. 8, the processor 20 screen-displays a list of apps and, in response to a selecting operation, sets and registers an app for which information can be referred to even in an operation-locked state. As a result, a user can freely set and register an app for which information is referable even when in an operation-locked state among the apps on the mobile terminal 1.

Figure 9:
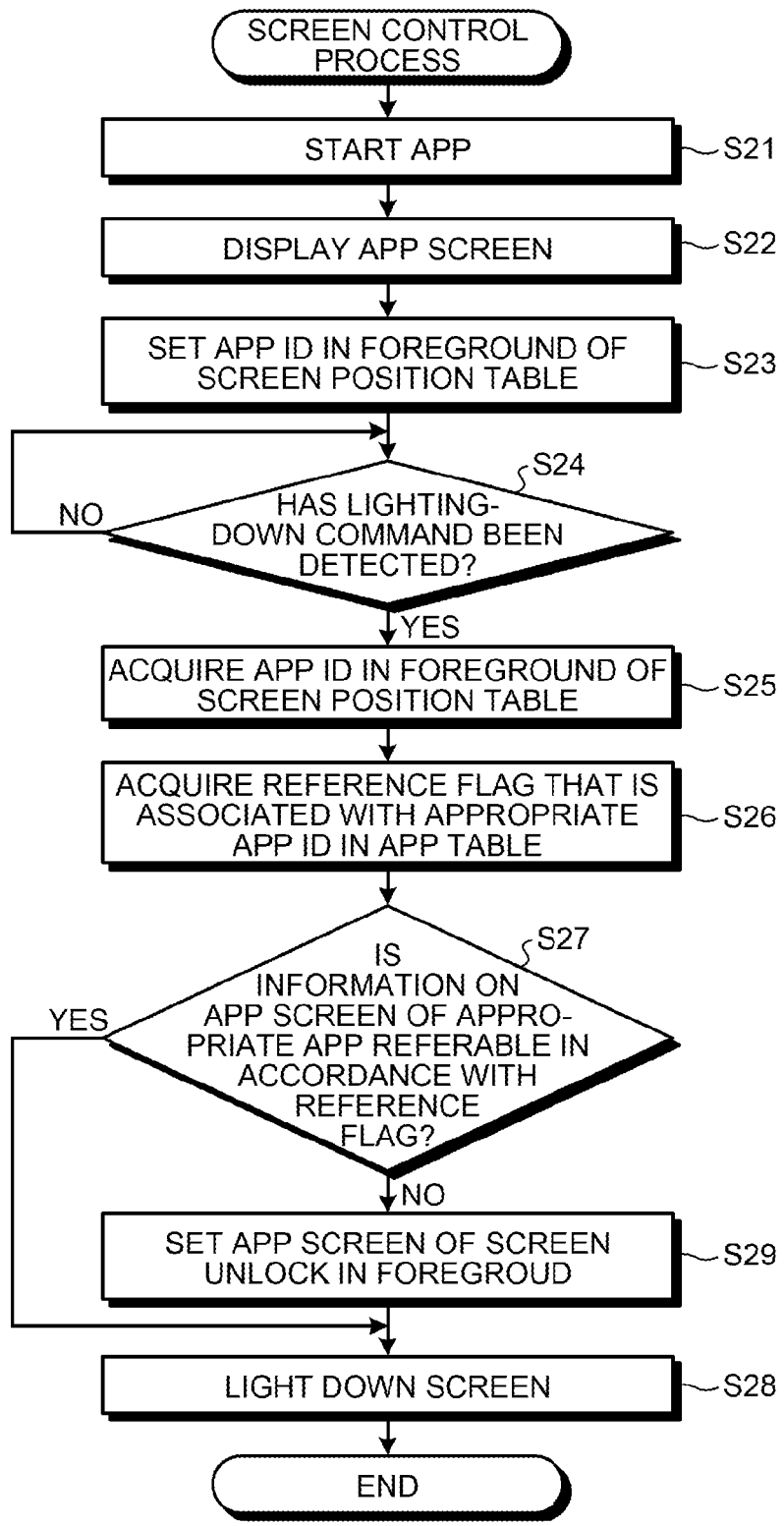
FIG. 9 is a flowchart that illustrates an exemplary operation of the processor in relation to a screen control process.

FIG. 9 is a flowchart that illustrates an exemplary operation of the processor 20 in relation to a screen control process. The screen control process illustrated in FIG. 9 is a process for, when the screen is lighted down in response to a lighting-down command while the current app screen is screen-displayed, controlling the changing of an app screen in accordance with the result of a determination as to whether information on the current app is referable.

With reference to FIG. 9, after starting an app (Step S21), the processor 20 screen-displays the app screen in the foreground window of the display unit 16 (Step S22). After screen-displaying the app screen in the foreground window, the processor 20 sets and registers the app ID 32B identifying the started app in the "foreground" of the screen position 32A of the screen position table 32 (Step S23). The processor 20 determines whether a lighting-down command has been detected (Step S24).

If a lighting-down command has been detected (Yes at Step S24), the processor 20 acquires the app ID 32B in the "foreground" of the screen position table 32 (Step S25). Furthermore, the processor 20 refers to the app table 31 so as to acquire the reference flag 31B that is associated with the app ID 31A in the "foreground" (Step S26).

The processor 20 acquires the reference flag 31B that is associated with the app ID 31A in the "foreground" and, in accordance with the acquired reference flag 31B, determines whether information on the app screen of the appropriate app is referable (Step S27). If information on the app screen of the appropriate app is referable (Yes at Step S27), the processor 20 lights down the display unit 16 (Step S28) and then terminates the operation illustrated in FIG. 9. If information on the app screen of the appropriate app is referable, the processor 20 registers the app ID of the appropriate app in the "foreground" of the screen position table 32 and also registers the app ID of the screen unlock in the "background".

If a lighting-down command has not been detected (No at Step S24), the processor 20 proceeds to Step S24 so as to determine whether a lighting-down command has been detected.

If information on the app screen of the appropriate app is not referable (No at Step S27), the processor 20 sets the app screen of the screen unlock in the foreground window (Step S29) and then proceeds to Step S28 so as to light down the screen of the display unit 16. Furthermore, if information on the app screen of the appropriate app is not referable, the processor 20 registers the app ID of the screen unlock in the "foreground" of the screen position table 32 and also registers the app ID of the appropriate app in the "background".

In the screen control process illustrated in FIG. 9, the processor 20 refers to the reference flag of the current app in response to a lighting-down command and, if information on the app screen is referable, sets the app ID of the appropriate app in the "foreground", and then lights down the screen of the display unit 16.

Moreover, if information on the app screen is not referable, the processor 20 sets the app ID of the screen unlock in the "foreground" and lights down the screen of the display unit 16.

Figure 10:
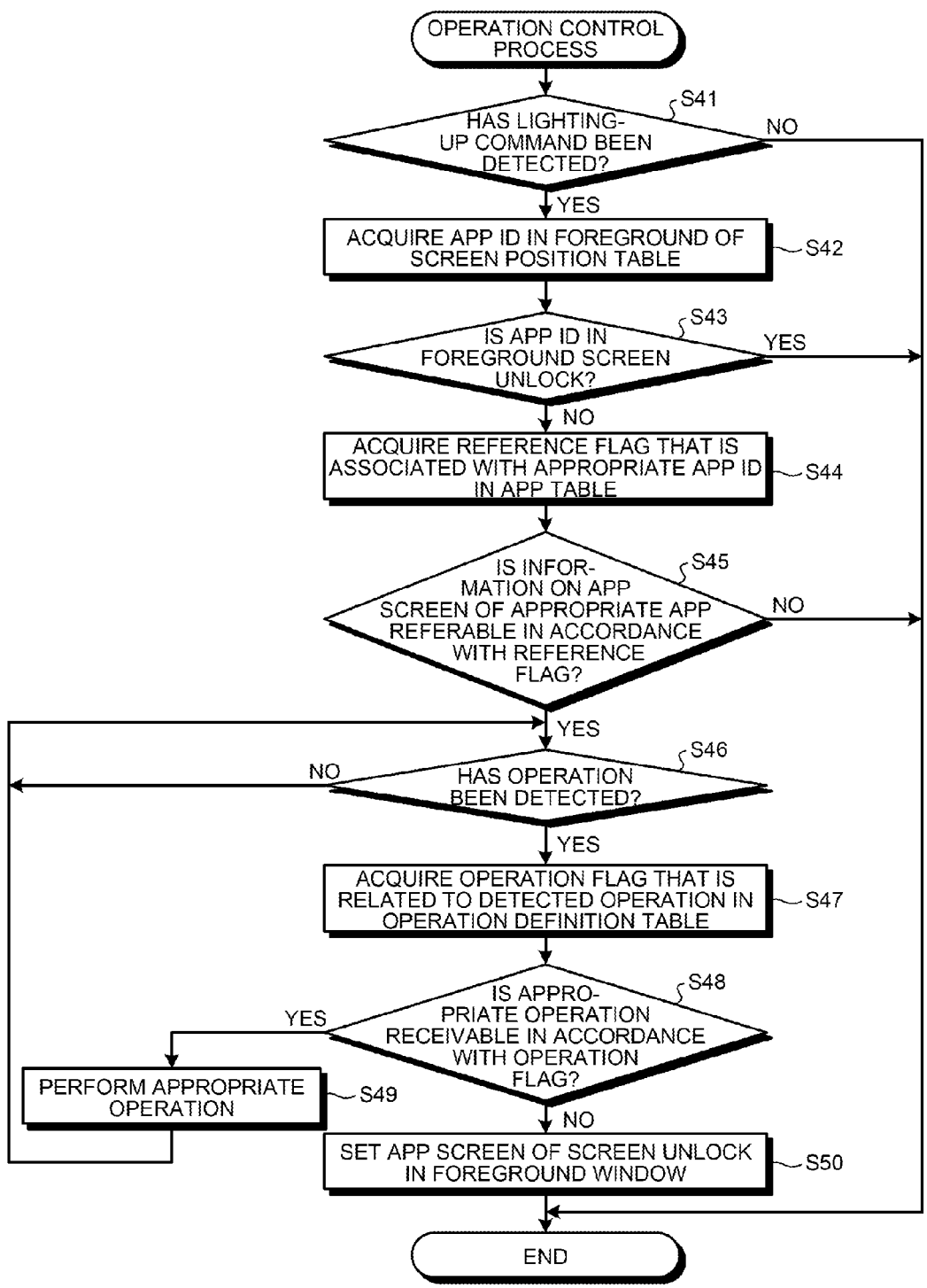
FIG. 10 is a flowchart that illustrates an exemplary operation of the processor in relation to an operation control process.

FIG. 10 is a flowchart that illustrates an exemplary operation of the processor 20 in relation to an operation control process. The operation control process illustrated in FIG. 10 is a process of restricting reception of operations of the mobile terminal 1 upon re-lighting while the screen of the display unit 16 is lighted down in an operation-locked state.

With reference to FIG. 10, the processor 20 determines whether a lighting-up command has been detected while the screen of the display unit 16 is lighted down in an operation-locked state (Step S41). If a lighting-up command has been detected (Yes at Step S41), the processor 20 acquires the app ID 32B in the "foreground" of the screen position table 32 (Step S42). The processor 20 determines whether the app ID 32B in the "foreground" of the screen position table 32 is the screen unlock (Step S43).

If the app ID in the "foreground" of the screen position table 32 is not the screen unlock (No at Step S43), the processor 20 acquires the reference flag 31B that is associated with the appropriate app ID 31A in the app table 31 (Step S44). If the processor 20 acquires the reference flag 31B that is related to the appropriate app ID 31A in the app table 31, the processor 20 determines whether information on the app screen of the appropriate app is referable in accordance with the acquired reference flag 31B (Step S45).

If information on the app screen of the appropriate app is referable (Yes at Step S45), the processor 20 determines whether a new operation has been detected (Step S46). If a new operation has been detected (Yes at Step S46), the processor 20 acquires the operation flag 33B that is related to the operation type 33A of the detected operation in the operation definition table 33 (Step S47). The processor 20 determines whether the appropriate operation is receivable in accordance with the acquired operation flag 33B (Step S48).

If the appropriate operation is receivable (Yes at Step S48), the processor 20 performs the appropriate operation (Step S49) and then proceeds to Step S46 so as to determine whether a new operation has been detected. Accordingly, the processor 20 refers to the operation definition table 33 and receives a touch panel operation, for example a scrolling operation, zoom-in or zoom-out operation, or the like, on the operation-restricted app screen of the map app.

If a lighting-up command has not been detected (No at Step S41), the processor 20 terminates the operation illustrated in FIG. 10. Furthermore, if the app ID 32B in the "foreground" of the screen position table 32 is the screen unlock (Yes at Step S43), the processor 20 terminates the operation illustrated in FIG. 10. As a result, the processor 20 waits for input of an unlock operation on the app screen of the screen unlock. Moreover, if information on the app screen of the appropriate app is deemed not referable on the basis of the reference flag 31B (No at Step S45), the processor 20 terminates the operation illustrated in FIG. 10.

If a new operation has not been detected (No at Step S46), the processor 20 proceeds to Step S46 so as to determine whether a new operation has been detected. If the appropriate operation is not receivable on the basis of the operation flag (No at Step S48), the processor 20 sets the app screen of the screen unlock in the foreground window (Step S50) and then terminates the operation illustrated in FIG. 10. The processor 20 registers the app ID 32B of the screen unlock in the "foreground" of the screen position table 32 and also registers the app ID 32B of the appropriate app in the "background".

In the operation control process illustrated in FIG. 10, the processor 20 detects re-lighting while the screen is lighted down in an operation-locked state and, if the app screen in the foreground is an app screen other than that of the screen unlock, acquires the reference flag of the app. If information on the current app screen is deemed referable on the basis of the reference flag, and if a new operation is detected, the processor 20 refers to the operation flag that is associated with the operation type. The processor 20 then restricts reception of operations on the basis of the operation flag that is associated with the operation type. As a result, a user can refer to information on the app screen even when in an operation-locked state. Furthermore, a user can carry out only "operable" operations on the app screen even in an operation-locked state.

If an "operable" operation is detected when an operation-restricted app screen is screen-displayed in an operation-locked state, the processor 20 receives the "operable" operation. As a result, a user can carry out "operable" operations on the app screen even in an operation-locked state.

If an "inoperable" operation is detected when an operation-restricted app screen is screen-displayed in an operation-locked state, the processor 20 screen-displays the app screen of the screen unlock in the foreground window without receiving the inoperable operation. Accordingly, the screen-unlock app screen enables a shift to an operation-locked state, whereby a user can prevent unauthorized operations being performed by a third party.

Figure 11:
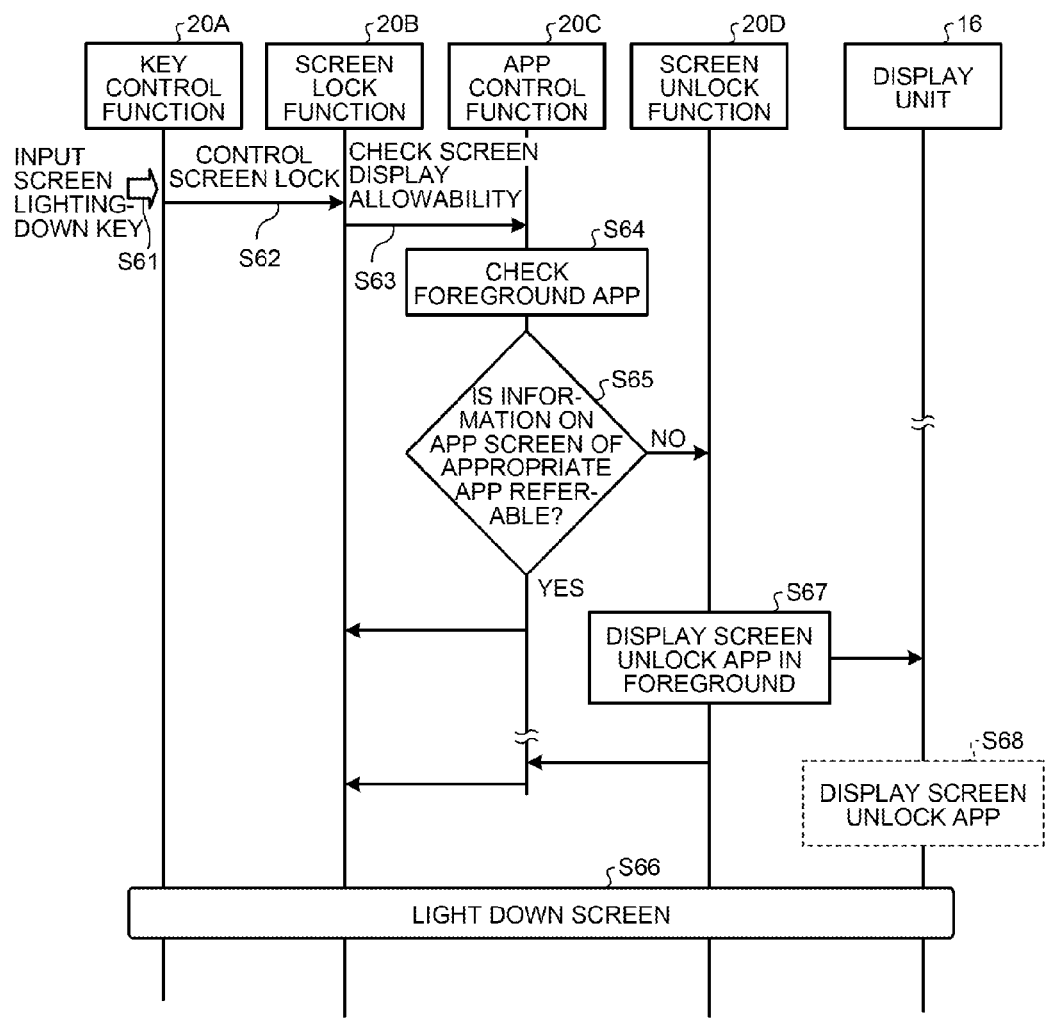
FIG. 11 is an operation sequence that illustrates an exemplary operation of the mobile terminal in relation to a screen control process.

FIG. 11 is an operation sequence that illustrates an exemplary operation of the mobile terminal 1 in relation to a screen control process. A key control function 20A, a screen lock function 20B, an app control function 20C, and a screen unlock function 20D, all illustrated in FIG. 11, are functions executed by the processor 20. When detecting an input operation of a screen lighting-down key in the key operating unit 18 (Step S61), the key control function 20A starts a lighting-down command and instructs the screen lock function 20B to start screen lock control (Step S62). The screen lock function 20B instructs the app control function 20C to unlock the screen and check the screen display allowability in response to the instruction for the start of screen lock control (Step S63).

When detecting the screen display allowability check, the app control function 20C refers to the screen position table 32 so as to check the app ID 32B that is related to the "foreground" of the screen position table (Step S64). When the app control function 20C checks the app ID 32B, the app control function 20C refers to the app table 31 so as to determine whether information on the app screen of the appropriate app with the app ID 31A in the app table 31 is referable (Step S65). If information on the app screen of the appropriate app is referable (Yes at Step S65), the processor 20 lights down the screen of the display unit 16 while keeping the app screen of the appropriate app currently displayed on the display unit 16 (Step S66).

If information on the app screen of the appropriate app is not referable (No at Step S65), the screen unlock function 20D instructs the display unit 16 to screen-display the app screen of the screen unlock in the foreground window of the display unit 16 (Step S67). At this point, the screen unlock function 20D registers the app ID 32B of the screen unlock in the "foreground" of the screen position table 32 and also registers in the "background" the app ID 32B that is previously registered in the "foreground". The display unit 16 then screen-displays the app screen of the screen unlock in the foreground window (Step S68). The processor 20 then proceeds to Step S66 so as to light down the screen of the display unit 16.

Figure 12:
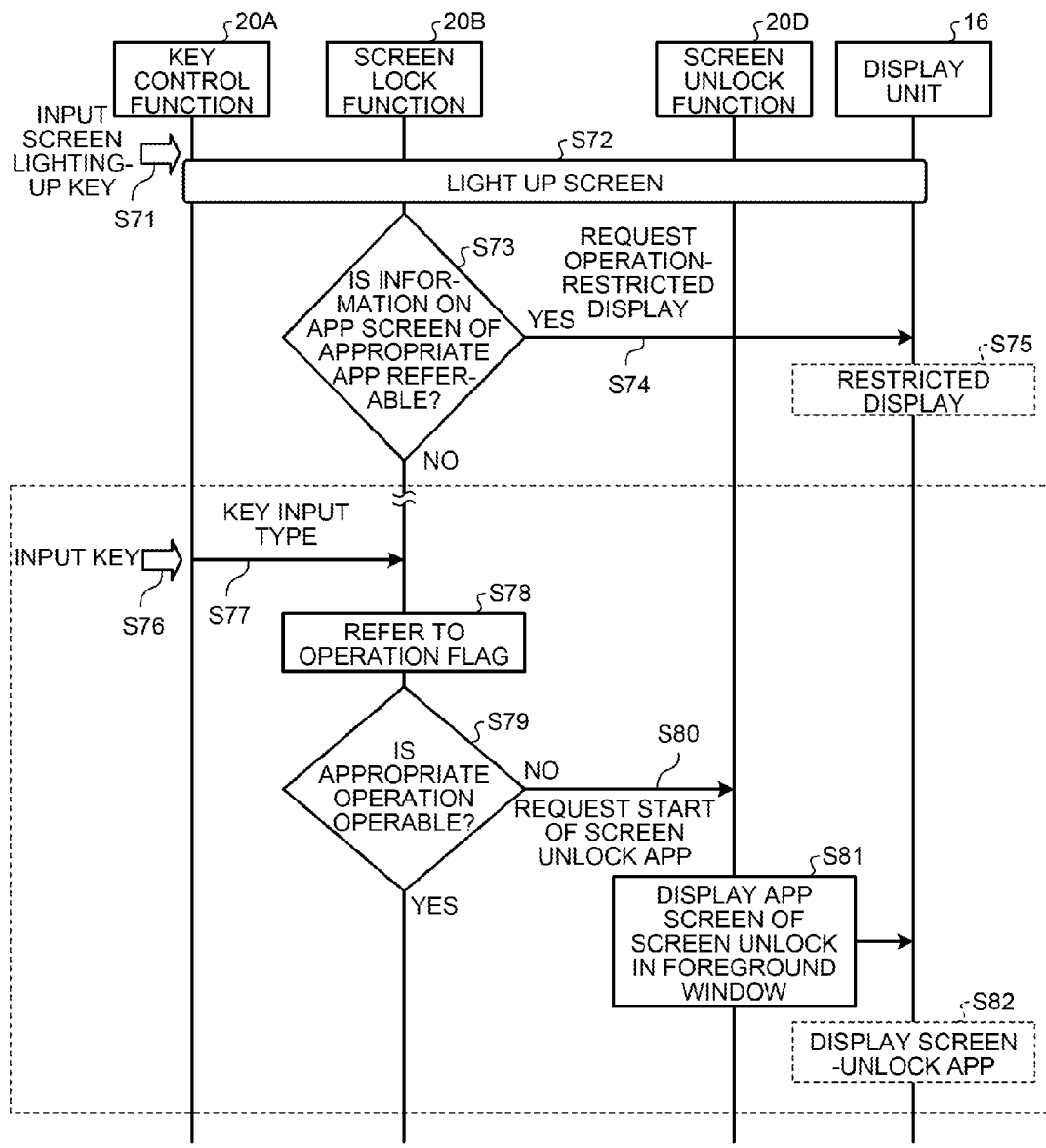
FIG. 12 is an operation sequence that illustrates an exemplary operation of the mobile terminal in relation to an operation control process.

FIG. 12 is an operation sequence that illustrates an exemplary operation of the mobile terminal 1 in relation to an operation control process. When detecting an input operation of a screen lighting-up key in the key operating unit 18 (Step S71), the key control function 20A starts a lighting-up command so as to light up the display of the display unit 16 (Step S72). After the screen of the display unit 16 is lighted up, the screen lock function 20B refers to the screen position table 32 and the app table 31. If the app ID of the app screen in the "foreground" is "referable" (Yes at Step S73), the screen lock function 20B gives to the display unit 16 a request for operation-restricted display of the app screen displayed in the foreground window (Step S74). When detecting the request for operation-restricted display, the display unit 16 screen-displays status information on the restricted app screen (Step S75).

When detecting a key input (Step S76), the key control function 20A notifies the screen lock function 20B of the operation type (contents) that corresponds to the key operation (Step S77). The screen lock function 20B refers to the operation definition table 33 so as to refer to the operation flag 33B that is related to the operation type 33A of the appropriate key operation (Step S78). The screen lock function 20B determines whether the operation flag 33B that is related to the operation type 33A of the appropriate key operation is "operable" (Step S79). If the operation flag 33B that is related to the operation type 33A of the appropriate key operation is "operable" (Yes at Step S79), the screen lock function 20B receives the appropriate key operation.

If the operation flag 33B that is related to the operation type 33A of the appropriate key operation is "inoperable" (No at Step S79), the screen lock function 20B gives to the screen unlock function 20D a request to start the app screen of the screen unlock (Step S80). When detecting the start request, the screen unlock function 20D gives a request to screen-display the app screen of the screen unlock in the foreground window of the display unit 16 (Step S81). In response to the display request, the display unit 16 screen-displays the screen-unlock app screen in the foreground window (Step S82). The screen unlock function 20D registers the app ID 32B of the screen unlock in the "foreground" of the screen position table 32 and registers the app ID 32B of the app screen in the "background".

The processor 20 according to the first embodiment refers to the app table 31 and, in response to a lighting-down command, acquires the reference flag 31B that is related to the current app. Furthermore, on the basis of the acquired reference flag 31B, the processor 20 determines whether the app screen of the operation unlock is to be screen-displayed in the foreground window instead of the current app screen. In accordance with the result of the determination, the processor 20 controls the changing of the screen in the foreground window. As a result, in the case of a referable app, a user can view information on the app screen even when in an operation-locked state. Moreover, there is no need to perform an operation unlock operation even in an operation-locked state, whereby it is possible to reduce the workload when continuously using the app screen.

If it is determined that the app screen is to be screen-displayed in the foreground window, the processor 20 screen-displays the app screen in the foreground window and also restricts operations on the mobile terminal 1 in accordance with the operation flag in the operation definition table 33. As a result, a user can view information on the app screen and carry out some operations even when in an operation-locked state.

When the processor 20 detects an operation other than an allowed operation while operations are restricted in accordance with the operation flag in the operation definition table 33, the processor 20 screen-displays the app screen of the operation unlock in the foreground window. As a result, it is possible to prevent unauthorized operations, or the like, performed by a third party and to improve security.

The processor 20 limits reception of operations on the mobile terminal 1 on the basis of the operation definition table 33 that manages the limitation details for each operation type of the mobile terminal 1. Accordingly, the mobile terminal 1 refers to the details of the operation definition table 33 so as to limit reception of operations on the mobile terminal 1 in an operation-locked state.

Even if the screen shifts to an operation-locked state due to the screen lighting down while a user views information on the app screen, the operation-locked state is maintained upon subsequent re-lighting and, without performing an operation of canceling the operation-locked state, the user can view the pervious app screen before the operation-locked state.

In the above-described first embodiment, the operation definition table 33 is managed by associating each operation type of the mobile terminal 1 with "operable" or "inoperable"; however, it may be managed by associating each operation type with "operable" or "inoperable" on a per-app basis. An embodiment in such a case will be explained below as a second embodiment. The same components as those of the mobile terminal 1 according to the first embodiment are denoted by the same reference numerals, and explanations are omitted for duplicated components and operations.

[b] Second Embodiment

FIG. 13 is an explanatory diagram that illustrates an example of the operation definition table 33 in the mobile terminal 1 according to a second embodiment. An operation definition table 40 illustrated in FIG. 13 is managed by relating each operation type 42 to an operation flag 43 on a per-app 41 basis. The app 41 includes for example a map, a browser, music, a recipe, picture drawing, a game, or the like. The operation type 42 includes for example touch panel operation, key operation, screen transition, file referencing, external connection, communication, or the like. The operation flag 43 is an identifier that identifies "operable" or "inoperable" when in an operation-locked state.

The processor 20 refers to the operation definition table 40 illustrated in FIG. 13 and, if the app 41 is for example "map", the processor 20 recognizes that the operation flag 43 of a touch panel operation is "operable", and the operation flag 43 of a key operation, screen transition, file referencing, external connection, and communication is "inoperable".

If the app 41 is for example "game", the processor 20 recognizes that the operation flag 43 of a touch panel operation, key operation, and screen transition is "operable", and the operation flag 43 of file referencing, external connection, and communication is "inoperable".

If the processor 20 detects an operation on the app screen for which operations are restricted in an operation-locked state, the processor 20 refers to the operation definition table 40 and refers to the operation flag 43 of the appropriate operation type 42 that is associated with the operation-restricted app 41. The processor 20 refers to the operation flag 43 of the appropriate operation type 42 so as to determine whether the operation flag 43 of the appropriate operation type 42 is "operable".

Next, an explanation is given of an operation of the mobile terminal 1 according to the second embodiment. FIG. 14 is a flowchart that illustrates an exemplary operation of the processor 20 in relation to an operation control process according to the second embodiment. The operation control process illustrated in FIG. 14 is a process to, when reception of operations of the mobile terminal 1 is limited in response to re-lighting while the screen of the display unit 16 is lighted down in an operation-locked state, limit reception of operations in accordance with operation types on a per-app basis.

With reference to FIG. 14, the processor 20 performs the operation from Steps S41 to S46. If the processor 20 detects an operation while operations are limited (Yes at Step S46), the processor 20 refers to the operation definition table 40 illustrated in FIG. 13 so as to acquire the operation flag 43 that is related to the operation type 42 of the appropriate app 41 in the operation definition table 40 (Step S47A). The processor 20 then proceeds to Step S48 so as to determine whether the appropriate operation type 42 is "operable" on the basis of the operation flag 43.

If the processor 20 detects a "touch panel operation" while operations are limited in, for example, a map app, the processor 20 refers to the operation definition table 40 illustrated in FIG. 13. If the operation flag 43 that is associated with the map app and a touch panel operation is "operable" at Step S47A (Yes at Step S48), the processor 20 proceeds to Step S49 so as to perform the appropriate operation.

Furthermore, if the processor 20 detects an "external connection" while operations are limited in, for example, a map app, the processor 20 refers to the operation definition table 40 illustrated in FIG. 13. If the operation flag 43 that is associated with the map app and an external connection is "inoperable" at Step S47A (No at Step S48), the processor 20 proceeds to Step S50 so as to screen-display the screen unlock in the foreground window of the display unit 16.

In the operation control process illustrated in FIG. 14, the processor 20 detects re-lighting while the screen is lighted down in an operation-locked state and, if the app screen in the foreground is not the app screen of the screen unlock, acquires the reference flag of the appropriate app. If information on the current app screen is deemed referable on the basis of the reference flag, and if a new operation is detected, the processor 20 refers to the operation flag that is related to the operation type of the current app. The processor 20 then restricts reception of operations on the basis of the operation flag that is related to the operation type. As a result, a user can view information on the app screen even in an operation-locked state. Furthermore, a user receives only "operable" operations on the app screen even in an operation-locked state. As an operation flag is set for each operation type on a per-app basis, it is possible to limit the reception of operations in a wide variety on a per-app basis.

If the processor 20 detects an "operable" operation when screen-displaying the app screen for which operations are restricted in an operation-locked state, the processor 20 receives the "operable" operation. As a result, a user can carry out an "operable" operation on the app screen even when in an operation-locked state.

If the processor 20 detects an "inoperable" operation when screen-displaying the app screen for which operations are restricted in an operation-locked state, the processor 20 does not receive the "inoperable" operation, but screen-displays the app screen of the screen unlock in the foreground window. Accordingly, the mobile terminal 1 shifts to an operation-locked state by using the app screen of the screen unlock, whereby prevention of unauthorized operations performed by a third party, or the like, and improvement in security effectiveness are achieved for users.

The processor 20 according to the second embodiment limits reception of operations on the mobile terminal 1 on the basis of the details of the operation definition table 40 that manages the limitation details for each operation type of the mobile terminal 1 on a per-app basis. Accordingly, the mobile terminal 1 refers to the details of the operation definition table 40 so as to limit reception of operations on the mobile terminal 1 on a per-app basis in an operation-locked state.

Although the mobile terminal 1 is for example a smart-phone, or the like, in each of the above-described embodiments, it may be for example a mobile phone, portable gaming terminal, tablet terminal, mobile terminal without a communication function, or the like.

The details of the operation definition table 33 and the operation definition table 40 according to the above-described embodiments may be set and registered freely in response to a user's setting operation.

Components of each unit illustrated do not necessarily need to be physically configured as illustrated in the drawings. Specifically, specific forms of separation and combination of each unit are not limited to those depicted in the drawings. It is possible that all or some of units may be functionally or physically separated or combined in an arbitrary unit depending on various types of loads or usage.

All or any of various processing functions performed by each device may be implemented by a CPU (Central Processing Unit) (or a microcomputer such as an MPU (Micro Processing Unit), MCU (Micro Controller Unit), or the like). It is obvious that all or any of various processing functions may be implemented by programs analyzed and executed by a CPU (or a microcomputer such as an MPU or MCU) or by wired logic hardware.

Figure 15:
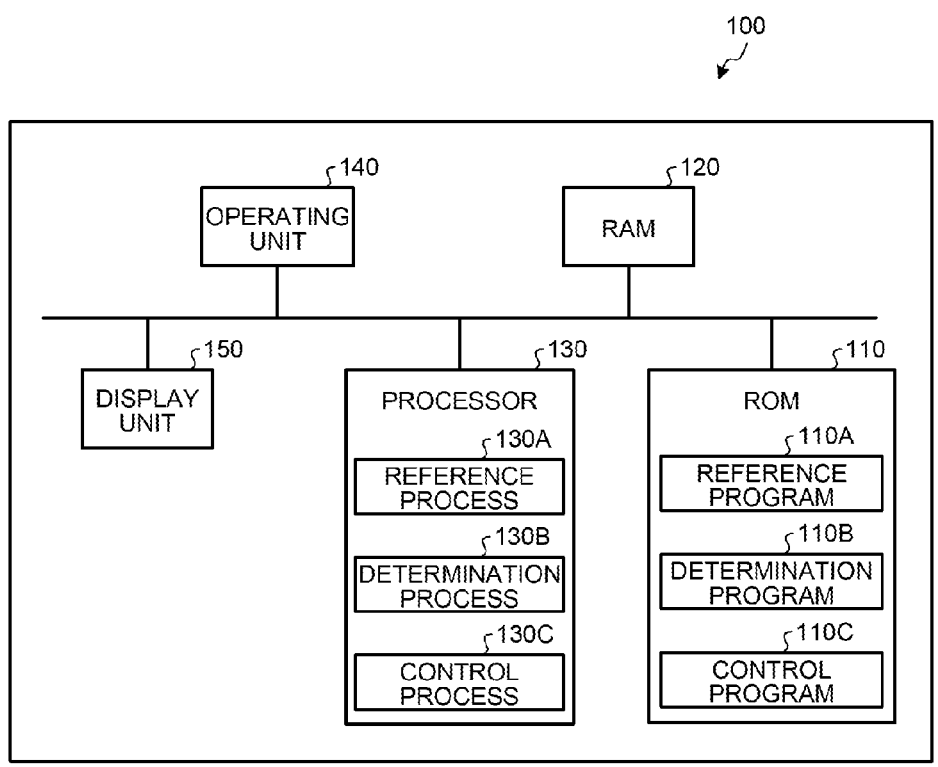
FIG. 15 is an explanatory diagram that illustrates an information processing apparatus that performs an operation control program.

An information processing apparatus performs prepared programs so that various processes that have been described in the embodiments may be performed. In the following, an explanation is given of an example of an information processing apparatus that performs a program that has the same functionality as that in the above-described embodiment. FIG. 15 is an explanatory diagram that illustrates an information processing apparatus that performs an operation control program.

An information processing apparatus 100 that executes the operation control program illustrated in FIG. 15 includes a ROM 110, a RAM 120, a processor 130, an operating unit 140, and a display unit 150.

The ROM 110 pre-stores therein an operation control program that executes the same functionality as that in the above-described embodiment. Instead of the ROM 110, an operation control program may be recorded on a recording medium readable by an undepicted drive. The recording medium may be, for example, a portable recording medium such as a CD-ROM, DVD disk, USB memory, or SD card, or a semiconductor memory such as a flash memory. As illustrated in FIG. 15, the operation control program includes a reference program 110A, a determination program 110B, and a control program 110C. The reference program 110A, the determination program 110B, and the control program 110C may be combined or separated as appropriate.

A processor 130 reads the reference program 110A, the determination program 110B, and the control program 110C from the ROM 110 and executes each read program. As illustrated in FIG. 15, the processor 130 performs the reference program 110A, the determination program 110B, and the control program 110C as a reference process 130A, a determination process 130B, and a control process 130C. A RAM 120 manages identification information on a per-app basis, the identification information indicating whether an authentication screen is to be screen-displayed in the foreground window of a display unit 150.

The processor 130 refers to the RAM 120, which manages identification information that indicates whether an authentication screen is to be screen-displayed in the foreground window of the display unit 150 on a per-app basis, and acquires from the RAM 120 the identification information that corresponds to the current app in response to a predetermined command. Furthermore, the processor 130 determines whether the authentication screen is to be screen-displayed in the foreground window in accordance with the acquired identification information. Moreover, the processor 130 controls the changing of the screen in the foreground window in accordance with the result of the determination. Accordingly, if an authentication screen is not screen-displayed in the foreground window for the app, the app screen is screen-displayed in the foreground window even in an operation-locked state. Even in an operation-locked state, there is no need to perform an unlock operation for canceling the operation-locked state; therefore, it is possible to reduce the workload when continuously using the app screen.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile electronic device comprising a processor, wherein the processor executes a process comprising:
   storing in a storage identification information on a per-application basis, the identification information indicating whether an authentication screen is to be displayed on a display;
   acquiring from the storage identification information that corresponds to an application displayed when the display is in a lighting-down condition in response to the lighting-down condition being satisfied;
   determining whether the authentication screen is to be displayed on the basis of the acquired identification information; and
   controlling, when the display enters a re-lighted state, the display to display the authentication screen or a screen of the application, on the basis of a result of the determination.

2. The mobile electronic device according to claim 1, wherein the processor further executes, when it is determined that the authentication screen is not to be displayed, limiting an operation on the mobile electronic device on the basis of a predetermined condition while displaying the screen of the application.

3. The mobile electronic device according to claim 2, wherein the processor further executes, when an operation other than an allowed operation is detected while an operation is limited on the basis of the predetermined condition, displaying the authentication screen.

4. The mobile electronic device according to claim 2, wherein the processor further executes limiting an operation on the mobile electronic device on the basis of the predetermined condition, the predetermined condition managing a limitation detail for each operation type of the mobile electronic device.

5. The mobile electronic device according to claim 2, wherein the processor further executes limiting an operation on the mobile electronic device on the basis of the predetermined condition, the predetermined condition managing a limitation detail for each operation type of the mobile electronic device on a per-application basis.

6. A non-transitory computer readable recording medium having stored therein an operation control program causing a mobile electronic device to execute a process comprising:
- storing in a storage identification information on a per-application basis, the identification information indicating whether an authentication screen is to be displayed on a display;
- acquiring from the storage identification information that corresponds to an application displayed when the display is in a lighting-down condition in response to the lighting-down condition being satisfied;
- determining whether the authentication screen is to be displayed on the basis of the acquired identification information; and
- controlling, when the display enters a re-lighted state, the display to display the authentication screen or a screen of the application, on the basis of a result of the determination.

7. An operation control method that causes a mobile electronic device to execute a process comprising:
- storing in a storage, using a processor of the mobile electronic device, that stores identification information on a per-application basis, the identification information indicating whether an authentication screen is to be displayed on a display;
- acquiring from the storage, using the processor, identification information that corresponds to an application displayed when the display is in a lighting-down condition in response to the lighting-down condition being satisfied;
- determining whether the authentication screen is to be displayed on the basis of the acquired identification information, using the processor; and
- controlling, when the display enters a re-lighted state, the display to display the authentication screen or a screen of the application, on the basis of a result of the determination, using the processor.

\* \* \* \* \*